United States Patent [19]

Vindez

[11] Patent Number: 5,143,161
[45] Date of Patent: Sep. 1, 1992

[54] RIGHT ANGLE POSITIVE FEED TAPPER

[75] Inventor: Pierre G. Vindez, Redondo Beach, Calif.

[73] Assignee: P.V. Tool, Inc., Gardena, Calif.

[21] Appl. No.: 763,438

[22] Filed: Sep. 20, 1991

[51] Int. Cl.$^5$ .............................................. B23B 47/22
[52] U.S. Cl. ........................................ 173/19; 173/145; 408/137
[58] Field of Search .................. 173/19, 29, 47, 48, 173/145, 146; 408/14, 132, 137

[56] References Cited

U.S. PATENT DOCUMENTS 4,612,998  9/1986  Vindez .................................. 173/19
4,799,833  1/1989  Pennison et al. .................... 173/146

FOREIGN PATENT DOCUMENTS 0060186  9/1982  European Pat. Off. .............. 173/19

Primary Examiner—Douglas D. Watts
Assistant Examiner—Allan M. Schrock
Attorney, Agent, or Firm—Antonio M. Fernandez

[57] ABSTRACT

A positive feed spindle with automatic retraction for driving a thread cutting tool is provided by using a fixed feed nut threaded on the spindle. A motor drives the spindle through a gear train that includes a first coupling gear with upper side teeth for engaging lower side teeth of a second coupling gear that also has upper side teeth engaging lower side teeth of a third coupling gear. The first and third coupling gears are continually driven by the motor in opposite directions through radial teeth of each. The second coupling gear on the same shaft as the first and third coupling gear is automatically raised when the spindle has been driven a predetermined extent by raising the shaft to disengage from the first and engage the third to reverse direction of the spindle. Radial teeth of the second coupling gear remain meshed with teeth of an idle gear in the drive train. When the spindle has been withdrawn the same extent, the shaft is automatically lowered just enough to disengage the second coupling gear from the third without re-engaging the first coupling gear until another thread tapping cycle is manually started.

2 Claims, 1 Drawing Sheet

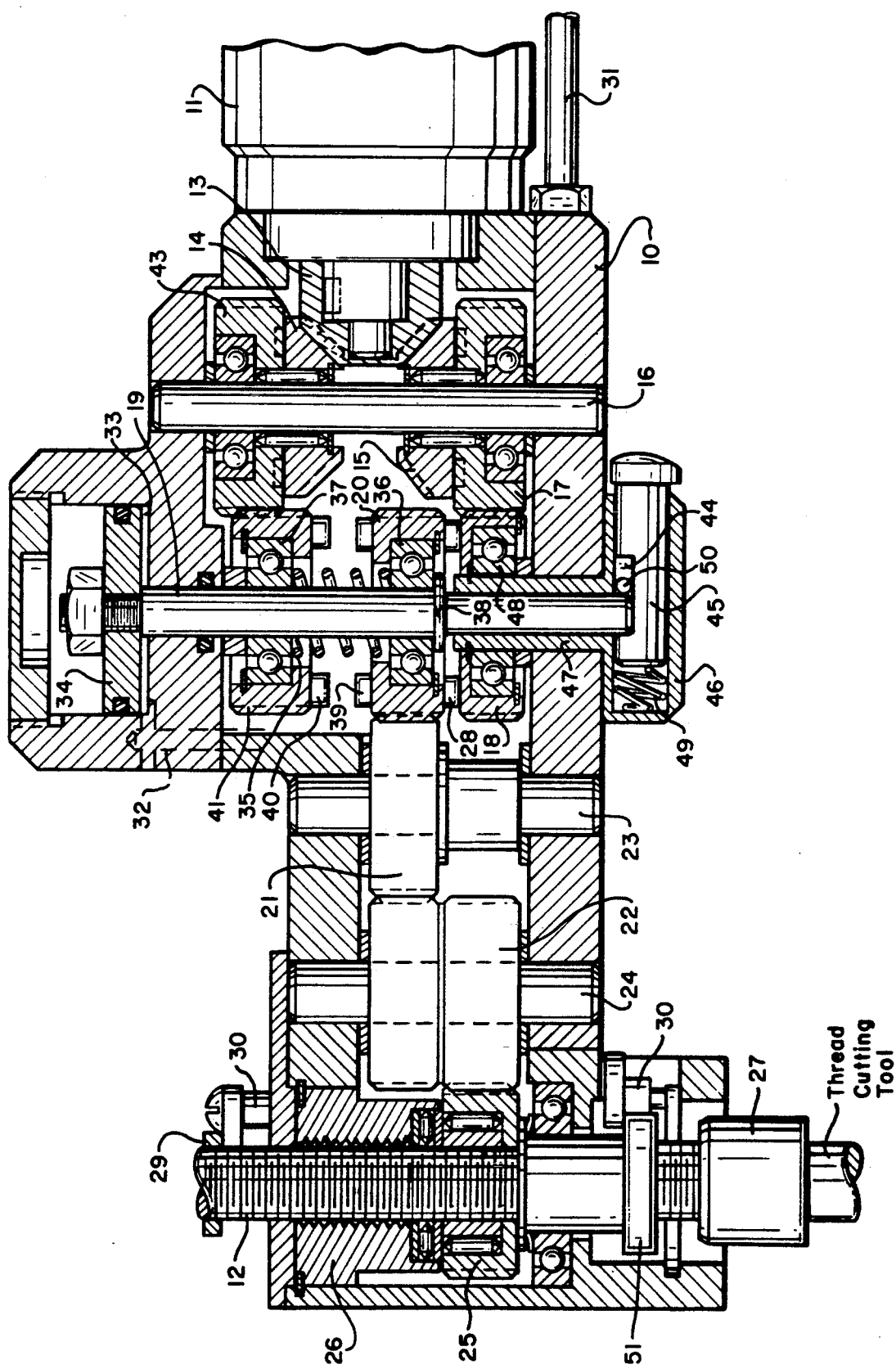

RIGHT ANGLE POSITIVE FEED TAPPER

BACKGROUND OF THE INVENTION

This invention relates to power tools for cutting threads on the inner surface of a hole previously made in or through a plate, and more particularly to such a power tool having positive feed and automatic retract of the thread cutting tool.

U.S. Pat. No. 4,612,998 discloses my prior invention relating to a right angle positive feed drill with an automatic retraction mode, and an idle mode that automatically follows after the drill bit has been retracted. An object of this invention is to adapt the mechanism for automatic retract and idle modes of a positive feed drill of my prior U.S. Pat. No. 4,612,998 (which, by this reference, is made a part hereof) to a positive feed tapper, thus providing a right angle tapper that will automatically cycle through positive feed tapping and retracting modes into an idle mode.

The positive feed drill disclosed in the aforesaid patent has a drive gear train for turning a spindle that is threaded into a feed gear driven by a second gear train coupled to the first (drive) gear train through side teeth on coupling gears of the two gear trains that turn on a common shaft. Only the coupling gear of the first (drive) train on that shaft is driven by a motor. The gear ratio of that first gear train is selected to be slightly less than the gear ratio of the second (feed) gear train so that the feed gear into which the spindle is threaded will turn slightly faster than the spindle driven by the first (drive) gear train to advance the spindle.

The first (coupling) gear of the feed gear train is supported by a collar affixed to the common shaft so that as that shaft is lifted, the coupling gear of the feed gear train disengages from the corresponding gear of the drive gear train. Once the spindle has been advanced a predetermined extent, a hydraulic piston is automatically actuated to lift that common shaft. The first (coupling) gear of the feed gear train is thus raised by the shaft sufficiently to disengage from the coupling gear on the common shaft of the drive gear train and to lock upper side teeth on stationary teeth affixed to the drill housing. As the motor continues to drive the spindle in the same direction through the first gear train, the spindle continues to turn in the feed gear at the end of the second gear train which is then locked. The spindle is thus automatically retracted.

Once the spindle has been retracted the problem is to disengage the upper side teeth of the gear in the feed gear train to unlock the feed gear train without re-engaging lower side teeth of the feed coupling gear with side teeth of the corresponding coupling gear on the common shaft of the first (drive) gear train. That problem is solved in the positive feed drill disclosed in the aforesaid patent by removing the hydraulic pressure on the piston that lifts the common shaft when the spindle has been advanced a predetermined extent, thereby to allow a spring between the first gear of the feed gear train and the housing to force that first gear down sufficiently to unlock the side teeth of that first gear.

In the meantime, as the common shaft was lifted to retract the spindle, a notch in a rod at the base of the common shaft (into which the common shaft is normally seated by the force of the aforesaid spring) is cleared by the base of the shaft to allow the spring to move the rod laterally with respect to the axis of the shaft That causes the notch in the rod to move from under the shaft. Thereafter, when hydraulic pressure is removed from the piston and the first (coupling) gear of the feed gear train is forced down away from the locking teeth by the coiled spring around the common shaft, the common shaft will move down sufficiently to disengage the locking teeth on the housing but not sufficiently for lower side teeth of the first gear in the feed gear train to re-engage the upper side teeth of the corresponding gear of the spindle drive gear train.

The positive feed drill having an automatic retract mode is thus placed in an idle mode until the notched rod is manually forced in against its spring sufficiently to position its notch under the shaft, at which time the shaft moves down under the force of the spring around the common shaft, and the lower side teeth of the first gear of the feed gear train re-engage the upper side teeth of the corresponding gear of the spindle drive gear train for another drilling cycle.

SUMMARY OF THE INVENTION

In accordance with this invention, a positive feed tapper with automatic retraction is achieved by affixing a lead nut threaded on a spindle to the tapper housing so that as the spindle is turned by a motor through a drive gear train, the spindle advances a tool for cutting threads on an inner surface of a hole in a workpiece as it turns in the lead nut. Once the spindle has advanced a predetermined extent, means such as a hydraulic piston or the equivalent is actuated to raise a shaft for a first coupling gear of the drive gear train, thereby raising a second coupling gear out of engagement with side teeth of the first coupling gear of the spindle drive gear train and into engagement with side teeth of a third coupling gear that turns in a bearing on the same shaft as the first and second coupling gears but driven by the motor in an opposite direction through another gear train.

The foregoing is accomplished by driving both the third coupling gear and the first coupling gear on the common shaft by the same motor through separate bevel gears. Each of the first and third coupling gears is driven by the same bevel gear on the motor shaft and each is keyed to a separate spur gear to turn the first and third coupling gears separately. One spur gear, referred to as the lower spur gear, is in the lower gear train for forward spindle drive. The other (upper) spur gear opposite the lower spur gear is in the gear train for reverse spindle drive.

Lifting the common shaft of the coupling gears automatically switches the second coupling gear into engagement with side teeth of the third coupling gear meshed with the upper spur gear. The second coupling gear remains in engagement with the balance of the spindle drive gear train, but when lifted out of engagement with the first coupling gear into engagement with side teeth of the third coupling gear, the direction of rotation of the second coupling gear reverses. This causes the spindle turning in the stationary lead nut to reverse direction and thus be retracted. Once retracted the same predetermined extent it was advanced, the hydraulic pressure or other shaft-raising force is removed automatically by means for sensing full retraction of the spindle.

A spring around the common shaft of the second and third coupling gears forces the common shaft down against a notched rod. The notch in the rod is forced out from under the common shaft during the retract mode by a spring. Consequently, when the shaft-raising force is removed, the third coupling gear, which is always driven by the motor through a spur gear and a bevel gear, becomes disengaged from the second coupling gear which does not re-engage the first coupling gear. The positive feed tapper thus remains in an idle mode until the notched rod is manually forced against its spring to position its notch under the common shaft of the coupling gears to start another tapping cycle.

BRIEF DESCRIPTION OF THE DRAWINGS

The sole figure shows a vertical cross section of a right angle positive feed tapper with retract and idle modes embodying the invention.

DESCRIPTION OF PREFERRED EMBODIMENTS

Referring to the sole figure, which shows a vertical cross section of the main housing 10 attached to an air motor 11, the general arrangement for driving the spindle 12 with a thread cutting tool attached will first be described. The arrangement which constitutes the present invention will then be described, namely the arrangement for feeding the spindle as the tool (not shown) attached to the spindle 12 cuts right-hand threads in the inside wall of a hole drilled in or through a plate, then automatically retracting it once the spindle has been advanced a predetermined extent, and finally, after the spindle has been retracted, placing the positive feed tapper in the idle mode.

A beveled gear 13 keyed on the shaft of the motor 11 meshes with a beveled gear 15 on a vertical shaft 16 Keyed With the beveled gear 15 is a spur gear 17 which meshes with a forward drive coupling gear 18 on a vertical shaft 19 for the spindle drive train comprised of an intermediate coupling gear 20, idlers 21 and 22 on respective vertical shafts 23 and 24, and a gear 25 slidably keyed to the spindle 12.

The spindle 12 is threaded through a stationary lead nut 26. As the forward drive coupling gear 18 is turned by the motor through the beveled gear 15 and spur gear 17, the gear train just described rotates the spindle clockwise (or counterclockwise) to feed the spindle 12 forward as the tool (not fully shown) in the end 27 of the spindle cuts right-hand threads in the inside wall of a hole in or through a plate (not shown). It should be noted that the pitch of the threads in the lead nut 26 determines the pitch of threads cut by this positive feed tapper.

Once the spindle has been fed down a predetermined extent as viewed in the figure, it is retracted from the plate by reversing the direction of rotation of the spindle drive gear train 21, 22 and 25, as will now be described.

Mounted on the shaft 19 is the intermediate coupling gear 20, which is normally locked onto the first coupling gear 18 by the side teeth 28 so that it too is driven by the motor through the beveled gears 14 and 15, and the spur gear 17 locked with the beveled gear 15. Thus, the forward drive coupling gear 18 turns the intermediate coupling gear 20 through interlocking side teeth. The spindle feed gear 25 is thus turned through the idlers 2 and 22 to rotate the spindle clockwise while the forward drive coupling gear 18 turns the intermediate coupling gear 20.

When the spindle 12 has been advanced sufficiently for an upper spindle nut 29 (fixed in position on the spindle 12 by a set screw) to actuate a valve stem 30, air under pressure through a line 31 from a pressure line that powers the motor 11 is connected through an air passage 32 into a piston cylinder 33 which forces a piston 34 upwardly against the force of a compression coil spring 35 between a bearing 36 and a bearing 37 supported on a flange 38 affixed to the shaft 19. As the piston 34 moves upwardly, it raises the intermediate coupling gear 20 so that its lower side teeth 28 are disengaged from side teeth of the forward drive coupling gear 18, and its upper side teeth 39 engage side teeth 40 on a reverse drive coupling gear 41.

The reverse drive coupling gear 41 turns in a direction opposite the forward drive coupling gear 18 because it is driven by a bevel gear 14 opposite the bevel gear 15 and a spur gear 43. These gears 14, 43 and 41 are continuously driven in a direction opposite the gears 15, 17 and 18, but until the shaft 19 is lifted by the piston 34, the gear train comprised of gears 20, 21, 22 and 25 are driven by the forward drive coupling gear 18 to feed the spindle 12 forward as it is turned to cut right-hand threads. For cutting left-hand threads, the lead nut 26, spindle 12, upper spindle nut 29 and a lower spindle nut 51 ma be made with left-hand threads instead of right-hand threads.

Once the shaft 19 is raised by the piston 34 to engage the intermediate coupling gear 20 with the reverse drive coupling gear 41, the end of the shaft 19 opposite the piston 34 is raised out of engagement with a notch 44 in a rod 45 guided in a tube 46 that is made as a unitary part of a sleeve 47 for the shaft 19 on which the forward drive coupling gear 18 is journaled with a ball bearing 48 so that the shaft 19 may move axially without raising the forward drive coupling gear 18. A compression coil spring 49 then pushes the rod 45 so that the notch 44 is no longer in alignment with the shaft 19. A transverse pin 50 prevents the notched rod from slipping completely out of the guide tube 46.

Near the end 27 of the spindle, a lower spindle nut 51, which is adjustable on the spindle 12 to limit the return stroke, engages a lower valve arm to move the valve stem 30 back to its upper position where it cuts off air pressure to the piston cylinder 33 and opens the piston cylinder to exhaust.

Once the spindle is retracted, and the air pressure in the piston cylinder is released, as just described above, the intermediate drive coupling gear 20 is pushed out of locking engagement with side teeth 40 on the gear 41 by the coil spring 35 between the coupling gears 20 and 41, but the bottom of the shaft 19 is then seated against the rod 45 rather than in the notch 44 so that the intermediate drive coupling gear 20 does not drop far enough for its lower side teeth 28 to re-engage upper side teeth on the forward drive coupling gear 18. The tapper is then in an idle mode in that while the forward and reverse drive coupling gears 18 and 41 are still driven in opposite directions (clockwise and counterclockwise) the intermediate coupling gear 20 is not in engagement with either drive coupling gears.

To re-engage the forward drive coupling gear 18, the rod 45 is pushed in against the force of the compression coil spring 49, thus aligning the notch 44 in the rod 45 with the shaft 19. The coil spring between the coupling gears 20 and 41 then causes the shaft to drop into the notch 44, thus lowering the intermediate coupling gear 20 so that its side teeth 28 engage the side teeth of the forward coupling gear 18, thus once again driving the gear train 21, 22 and 25 to turn the spindle clockwise for forward feed as the spindle turns the cutting tool at its end 27 for another thread tapping cycle but not until the tapper has been repositioned relative to the same or another workpiece.

This arrangement of drive motor and gear trains has the advantage of driving the spindle a right angle so that it is possible to position the positive feed tapper in a space no greater than required for the spindle. A positive feed tapper that is arranged to drive the spindle on axis would require two or three times as much space depending upon the length of the motor.

Although a particular embodiment of the invention has been described and illustrated herein, it is recognized that modifications and equivalents may readily occur to those skilled in the art. One variation is to make the force used to raise the shaft 19 electromagnetic instead of hydraulic. Another variation is to make the gear ratios of the gear trains from the bevel gear 13 on the end of the shaft of the motor 11 to the first and third coupling gears, 18 and 41, different instead of equal so that the spindle will be retracted at a higher (or lower) speed, instead of at the same speed that it is fed while cutting threads. Consequently, it is intended that the claims be interpreted to cover such modifications and variations.

I claim:

1. A positive feed tapper having a drive gear train for a spindle threaded in a lead nut affixed to a housing for said tapper so that as said spindle is driven by a motor through said drive gear train within said housing, said spindle advances a tool for cutting threads on the inner surface of a hole in a workpiece, said positive feed tapper having means for retracting said spindle to withdraw said tool from tapped threads on said inner surface of said hole in said workpiece once said spindle has been advanced a predetermined extent, said retracting means comprising

- a shaft for supporting a first coupling gear in said drive gear train to turn on a bearing resting on said housing, a second coupling gear having upper and lower side teeth, said second coupling gear being engaged by upper side teeth of said first coupling gear with lower side teeth of said second coupling gear, said second coupling gear being supported on said shaft to turn on a bearing resting on a flange integral with said shaft, and a third coupling gear, said third coupling gear being supported on said shaft to turn on a bearing resting on a coil spring around said shaft between said second and third coupling gears, said third coupling gear turning on a bearing held against said housing by said coil spring,
- a gear train for continually driving said third gear in a direction opposite to which said first gear is continually driven by said motor,
- side teeth on said third coupling gear for engaging upper side teeth on said second coupling gear when said second coupling gear is raised against said coil spring by raising said shaft to an extent sufficient for upper side teeth of said second coupling gear to engage lower side teeth of said third coupling gear,
- means for sensing when said spindle has been advanced said predetermining extent,
- means responsive to said spindle advancement sensing means for producing a force to raise said shaft against the force of said coil spring said sufficient extent, thereby raising said second coupling gear on said shaft for said lower side teeth of said second gear to disengage upper side teeth of said first coupling gear, and said upper side teeth of said second coupling gear engage said lower side teeth of said third coupling gear,
- an idle gear in said drive gear train having radial teeth engaging radial teeth of said second coupling gear at all times before and after being raised,
- means for sensing when said spindle has been retracted an extent equal to the extent advanced,
- means responsive to said retraction sensing means for terminating said shaft raising force, thereby allowing said coil spring between said second coupling gear and said third coupling gear to cause upper side teeth of said second coupling gear and lower side teeth of said third gear to disengage,
- means responsive to said shaft being raised for engaging means for limiting an extent said shaft may be lowered under the force of said coil spring so that while upper side teeth of said second coupling gear disengages from lower side teeth of said third coupling gear, lower side teeth of said second coupling gear are prevented from re-engaging said upper side teeth of said first coupling gear, thereby placing said positive feed tapper in an idle mode with said spindle retracted but not driven while said motor continues to drive said first and third coupling gears, and
- means for manually resetting said limiting means to allow said shaft to be lowered under the force of said coil spring to an original position, thereby placing said positive feed tapper in a tapping mode with said spindle being driven to advance as it turns in said lead nut.

2. A positive feed tapper as defined in claim 1 wherein said drive gear train for driving said spindle by said motor is comprised of

- a first beveled gear on the end of a shaft of said motor,
- a second beveled gear mounted on an auxiliary shaft perpendicular to said motor shaft by a bearing and meshed with said first beveled gear,
- a first spur gear keyed to turn with said second beveled gear on said auxiliary shaft, teeth of said first spur gear being meshed with radial teeth of said first coupling gear,
- a third beveled gear mounted on said auxiliary shaft by a bearing and meshed with said first beveled gear on a side diametrically opposite said second beveled gear,
- a second spur gear keyed to turn with said third beveled gear on said auxiliary shaft, teeth of said second spur gear being meshed with radial teeth of said third coupling gear.

* * * * *